United States Patent
Segala

(10) Patent No.: US 12,006,908 B2
(45) Date of Patent: Jun. 11, 2024

(54) QUICK ADJUST ROOT PLATE ATTACHMENT FOR WIND TURBINE BLADE MOLDS

(71) Applicant: TPI Technology, Inc., Warren, RI (US)

(72) Inventor: Alexander L. Segala, Rehoboth, MA (US)

(73) Assignee: TPI Technology, Inc., Scottsdale, AZ (US)

( * ) Notice: Subject to any disclaimer, the term of this patent is extended or adjusted under 35 U.S.C. 154(b) by 64 days.

(21) Appl. No.: 17/847,611

(22) Filed: Jun. 23, 2022

(65) Prior Publication Data

US 2022/0412303 A1  Dec. 29, 2022

Related U.S. Application Data

(60) Provisional application No. 63/213,982, filed on Jun. 23, 2021.

(51) Int. Cl.
F03D 1/06 (2006.01)
(52) U.S. Cl.
CPC ........ F03D 1/0658 (2013.01); *F05B 2260/30* (2013.01)
(58) Field of Classification Search
CPC .... F03D 1/0658; F05B 2260/30; B29C 33/30; B29C 70/48; B29C 70/86; B29L 2031/085; B29D 99/0028; Y02E 10/72; Y02P 70/50
See application file for complete search history.

(56) References Cited

U.S. PATENT DOCUMENTS

2010/0080667 A1   4/2010  Reed
2014/0356176 A1  12/2014  Caruso
2019/0283347 A1*  9/2019  Walker .................. B29C 70/443

OTHER PUBLICATIONS

Invitation to Pay Additional Fees for Application No. PCT/US22/34666 dated Sep. 13, 2022.
International Search Report and Written Opinion for Application No. PCT/US22/34666 dated Nov. 18, 2022.

* cited by examiner

*Primary Examiner* — Aaron R Eastman
(74) *Attorney, Agent, or Firm* — Stephen J. Kenny; Foley Hoag LLP

(57) ABSTRACT

The present disclosure provides for a root plate assembly system, an axially adjustable, rigid connection between a metallic (e.g. steel) root plate and a composite root flange of a wind turbine blade mold. The system includes a root plate including a flange portion with at least one aperture disposed therein. The system includes a sealing collar disposed within the aperture in the root plate. The system includes at least one washer having a larger diameter than the aperture in the root plate. The system includes a threaded collar having a longitudinally extending channel and threads on an outer surfaces thereof. The system includes a fastener disposed at least partially within the longitudinally extending channel of the threaded collar. The system includes a locknut disposed above the fastener abutting the fastener and a bolt cover disposed over the locknut, the bolt cover abutting the collar.

16 Claims, 15 Drawing Sheets

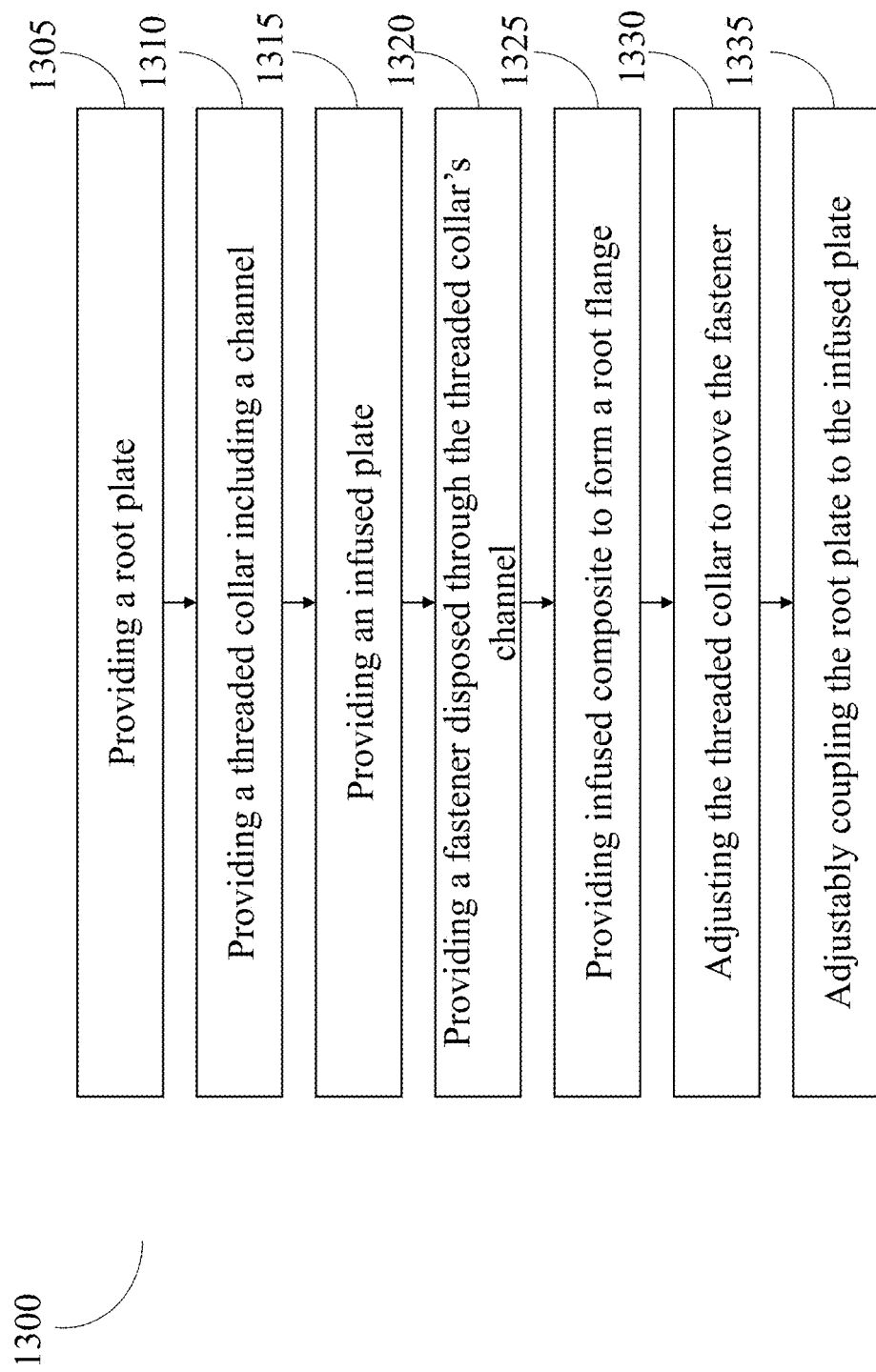

QUICK ADJUST ROOT PLATE ATTACHMENT FOR WIND TURBINE BLADE MOLDS

CROSS REFERENCE TO RELATED APPLICATIONS

This application is a claims the benefit of priority under 35 USC 119 to U.S. Provisional Patent Application No. 63/213,982 filed Jun. 23, 2021, the entirety of which is incorporated by reference herein.

BACKGROUND OF THE DISCLOSED SUBJECT MATTER

Field of the Disclosed Subject Matter

The disclosed subject matter relates to a system for manufacturing a wind turbine blade. Particularly, the present disclosed subject matter is directed to systems and methods of manufacturing wind turbine blade root attachments. The present disclosure provides an axially adjustable, rigid connection between a metallic (e.g. steel) root plate and a composite root flange of a wind turbine blade mold.

Description of Related Art

Wind turbine blades generally comprise a hollow blade shell formed of composite materials, such as glass or carbon fiber reinforced plastic, formed in half shell molds (e.g. a pressure side mold, and a suction side mold) that can then be rotated into a closed mold/blade in a clamshell fashion. The root end of the blade shell is typically significantly thicker than the remainder of the shell in order to support the static and dynamic loads of the blade in use.

In existing blade manufacturing techniques, the increased shell thickness at the root end is achieved by building up a large number of fiber layers at the root ends of the half molds. A root plate is attached to the composite structure, however given the ever increasing size of turbine blades (and thus root plates), this assembly process is labor intensive and requires heavy equipment for supporting the entire root plate as the joint between the wind turbine blade to the rotor hub experiences high stresses. Further, any adjustment of the root plate requires complete removal of the root plate, followed by additional machining or part replacement to finalize the adjustments. There thus remains a need for an efficient and safe method and apparatus for providing an axially adjustable, rigid connection between a root plate and a composite root flange of a wind turbine blade mold, without need for any specialized equipment or tools.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a root plate assembly system for a wind turbine blade comprising: a root plate, the root plate including a flange portion with at least one aperture disposed therein; a sealing collar, the sealing collar disposed within the aperture in the root plate; at least one washer, the washer having a larger diameter than the aperture in the root plate; a threaded collar, the threaded collar having a longitudinally extending channel and threads on inner and outer surfaces thereof; a fastener disposed at least partially within the longitudinally extending channel of the threaded collar; a locknut disposed above the fastener, the locknut abutting the fastener; a bolt cover disposed over the locknut, the bolt cover abutting the collar.

Additionally, the threaded collar can include a first portion with a first diameter and a second portion with a second diameter, defining an interior shelf therebetween.

In some embodiments, the fastener can include a head portion and a stem portion, with the head portion abutting the shelf of the threaded collar.

Also, a root flange can be included and disposed adjacent the root plate.

In some embodiments, an infused root plate is disposed adjacent the root flange.

In some embodiments, the distal end of the fastener includes threads, with the fastener threads engaging the interior threads of an infused root plate.

In some embodiments, the locknut inhibits relative movement between the threaded collar and the root plate.

In some embodiments, the locknut has a diameter larger than the head of the fastener.

In some embodiments, the locknut has a diameter equivalent to a diameter of the threaded collar.

In some embodiments, the sealing collar has an internal diameter larger than the outer diameter of the threaded collar.

In some embodiments, the fastener, threaded collar, sealing collar, and sealing washers are axially aligned in a concentric configuration.

In some embodiments, a distal end of the threaded collar includes a non-threaded skirt portion.

In some embodiments, a distal end of the threaded collar includes a non-threaded conical portion.

In some embodiments, a spherical washer disposed between the threaded collar and the root flange.

In some embodiments, the spherical washer has an outer diameter less than the outer diameter of the threaded collar.

To achieve these and other advantages and in accordance with the purpose of the disclosed subject matter, as embodied and broadly described, the disclosed subject matter includes a method for axial adjustment of a root plate assembly system including providing a root plate including at least one aperture disposed therein. The method includes providing a threaded collar comprising a longitudinal extending channel and threads on an outer surface thereof. The method includes providing an infused root plate, the infused root plate including at least one aperture disposed therein. The method includes providing a fastener disposed at least partially within the longitudinal extending channel of the threaded collar and the root plate. The method includes providing infused composite to form a root flange, the root flange disposed between the root plate and the infused plate, the root flange further surrounding the threaded collar and the fastener. The method includes adjusting the threaded collar to longitudinally move the fastener relative to the root flange. The method includes adjustably coupling the root plate and the infused plate via the fastener disposed through the longitudinal extending channel of the threaded collar disposed therebetween.

In some embodiments, the threaded collar is fixed to the infused root plate.

In some embodiments, adjusting the threaded collar to longitudinally move the fastener comprises turning the threaded collar.

In some embodiments, adjustably coupling the root plate and the infused plate comprises coupling the root plate relative to the infused plate at a variable distance.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 13 is a flow diagram representing an exemplary method for adjustable root plate assembly according to embodiments of the disclosed subject matter.

DETAILED DESCRIPTION OF AN EXEMPLARY EMBODIMENT

Figure 1:
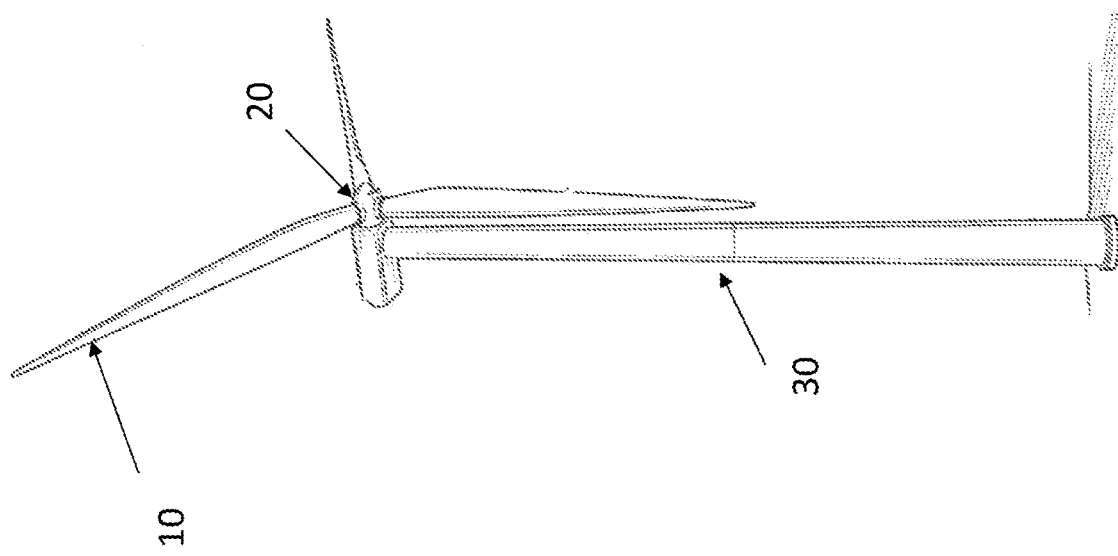
FIG. 1 is a schematic representation of an exemplary wind turbine in accordance with the disclosed subject matter.

Reference will now be made in detail to exemplary embodiments of the disclosed subject matter, an example of which is illustrated in the accompanying drawings. The method and corresponding steps of the disclosed subject matter will be described in conjunction with the detailed description of the system.

For purpose of explanation and illustration, and not limitation, an exemplary embodiment of the system in accordance with the disclosed subject matter is shown in FIG. 113. Similar reference numerals (differentiated by the leading numeral) may be provided among the various views and Figures presented herein to denote functionally corresponding, but not necessarily identical structures.

FIG. 1, depicts an exemplary wind turbine, the exemplary wind turbine includes a tower 30, a nacelle 20, nacelle 20 disposed at the apex of the tower, and a plurality of rotor blades 10 operatively coupled to a generator (not shown) housed inside the nacelle. In addition to the generator, the nacelle houses miscellaneous components required for converting wind energy into electrical energy and various components needed to operate, control, and optimize the performance of the wind turbine.

Each rotor blade 10 is formed as a composite structure with a root portion (for connection to the nacelle) and a tip. The composite root flange is formed from layers (or "plies" or "layups") of fiber segments that are infused with resin, e.g., vacuum-assisted resin transfer moulding (VARTM). The resin infusion process may comprise arranging a vacuum film over the mold and sealing the vacuum film against a surface, such as a flange of the mold, to define a sealed region encapsulating the layup. A vacuum pump can be employed to remove air from the sealed region. At the same time, resin is admitted into the sealed region. The resin infuses throughout the fibrous layers and between the root insert(s) and the fibrous layers. Each rotor blade may include one or more airfoils along the length of the blade. For example and without limitation, rotor blade 10 may include one airfoil along the length of the blade. In another example the airfoil may change along the length of the rotor blade 10. Each rotor blade 10 may include airfoils configured to be altered according to the direction of incoming wind and optimization of energy transfer from said wind.

Figure 2:
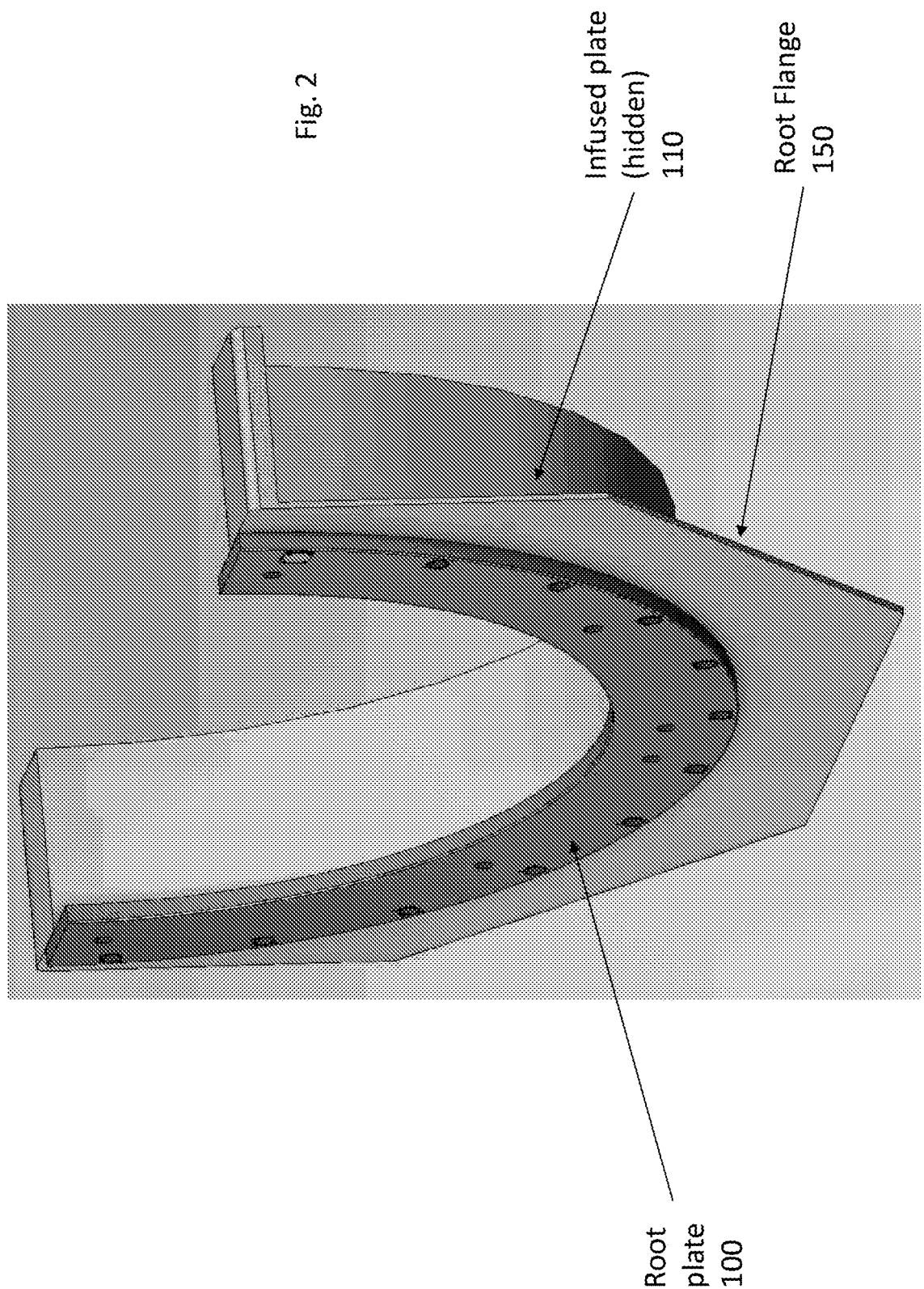
FIG. 2 is a front perspective view of an exemplary root plate and root flange connection of a wind turbine blade.

FIG. 2 depicts an exemplary coupling between the root plate 100 and the composite resin-infused root flange 150, shown in a perspective view of a single mold half (mold omitted for clarity). Root plate 100 may manufactured from one or more metals and/or one or more alloys thereof. For example and without limitation, root plate 100 may include one or more steels and their alloys. Root plate 100 may include carbon steel.

The carbon content of steel is between 0.002% and 2.14% by weight for plain carbon steel (iron-carbon alloys). Too little carbon content leaves (pure) iron quite soft, ductile, and weak. Carbon contents higher than those of steel make a brittle alloy commonly called pig iron. Alloy steel is steel to which other alloying elements have been intentionally added to modify the characteristics of steel. Common alloying elements include: manganese, nickel, chromium, molybdenum, boron, titanium, vanadium, tungsten, cobalt, and niobium. Additional elements, most frequently considered undesirable, are also important in steel: phosphorus, sulfur, silicon, and traces of oxygen, nitrogen, and copper.

Plain carbon-iron alloys with a higher than 2.1% carbon content are known as cast iron. With modern steelmaking techniques such as powder metal forming, it is possible to make very high-carbon (and other alloy material) steels, but such are not common. Cast iron is not malleable even when hot, but it can be formed by casting as it has a lower melting point than steel and good castability properties. Certain compositions of cast iron, while retaining the economies of melting and casting, can be heat treated after casting to make malleable iron or ductile iron objects. Steel is distinguishable from wrought iron which may contain a small amount of carbon but large amounts of slag. Root plate 100 may include one or more steels including 5355.

Root plate 100 may be configured to secure the root of a molded rotor blade 10 to a rotor or nacelle. Root plate 100 may be configured to secure the root of a molded rotor blade 10 to one or more components of a mold such as mold 500 or mold halves 504 and 508, which will be discussed at greater length herein below. Root plate 100 may be constructed from one or more composites itself. Root plate 100 may be constructed from one or more similar components as rotor blade 10 as described herein. Root plate 100 may include one or more apertures disposed therein. For the purposes of this disclosure, "aperture" is an opening in a component. Root plate 100 may include a plurality of apertures configured in an arc, circular pattern, rectangular pattern, match drilled or cast into the component such as root plate 100 during the manufacturing process. For example and without limitation, the aperture may include one or more through holes. For example and without limitation, the one or more apertures may include one or more threaded holes, utilizing common or unique threads each, according to one or more thread standards. The apertures may be machined post production or casted, forged, molded, formed, or otherwise manufactured during the making of root plate 100. The one or more apertures may include pilot holes for further processing.

Figure 3:
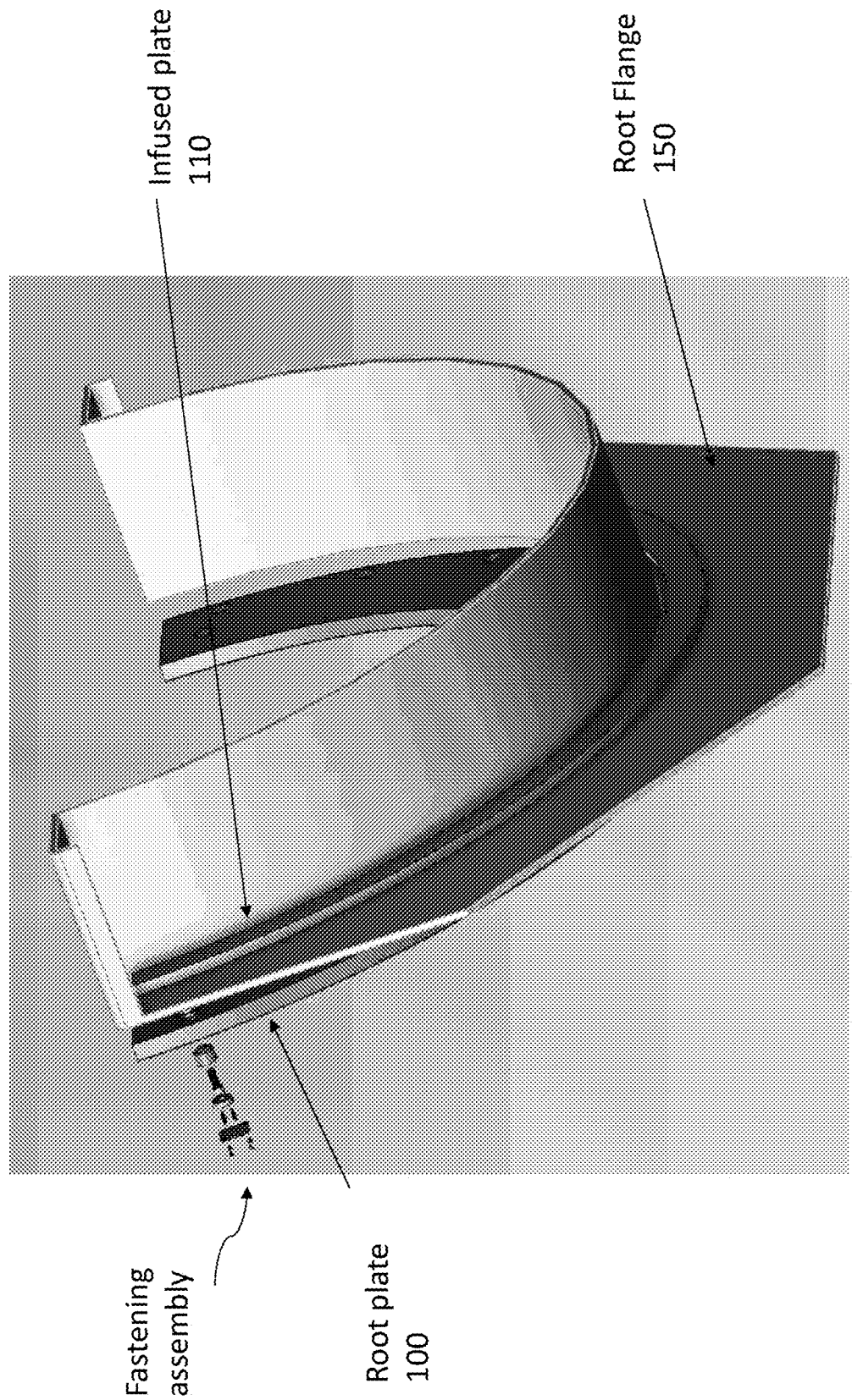
FIG. 3 is a rear perspective view of the exemplary root plate and root flange connection shown in FIG. 2.

Referring now to FIG. 3, root plate assembly system may include a rigid metallic plate such as an infused plate 110. Infused plate 110 may be infused partially or fully within a composite component of rotor blade 10. Infused plate 110 may be press fit, co-molded or machined and set into root flange 150. Infused plate 110 may be configured to sandwich the below root flange 150 along with root plate 100. Root plate 100 and infused plate 110 may sandwich root flange 150 and utilize one or more fasteners to clamp together thus securing root flange 150.

Root flange 150 may be one or more composite components disposed at the root of rotor blade 10 configured support the weight of the finished rotor blade 10 and resultant forces from wind and rotation as well as serve as a mating component with a rotor. Root flange 150 may be molded in the molding process of rotor blade 150 and/or manufactured prior to molding and placed with mold 500 before rotor blade 10 is completed. There may be one, two, or more root flanges 150 disposed within the mold 500 during the molding process. For example and without limitation, root flange 150 may be disposed on each of two mold halves and held together in the mold by one or more clamps and hinges. Root flange 150 may include one or more apertures consistent with the description of apertures herein. The one or more apertures disposed in root flange 150 may correspond to one or more patterns of apertures disposed in root plate 100 and/or infused plate 110, according to embodiments.

Figure 4:
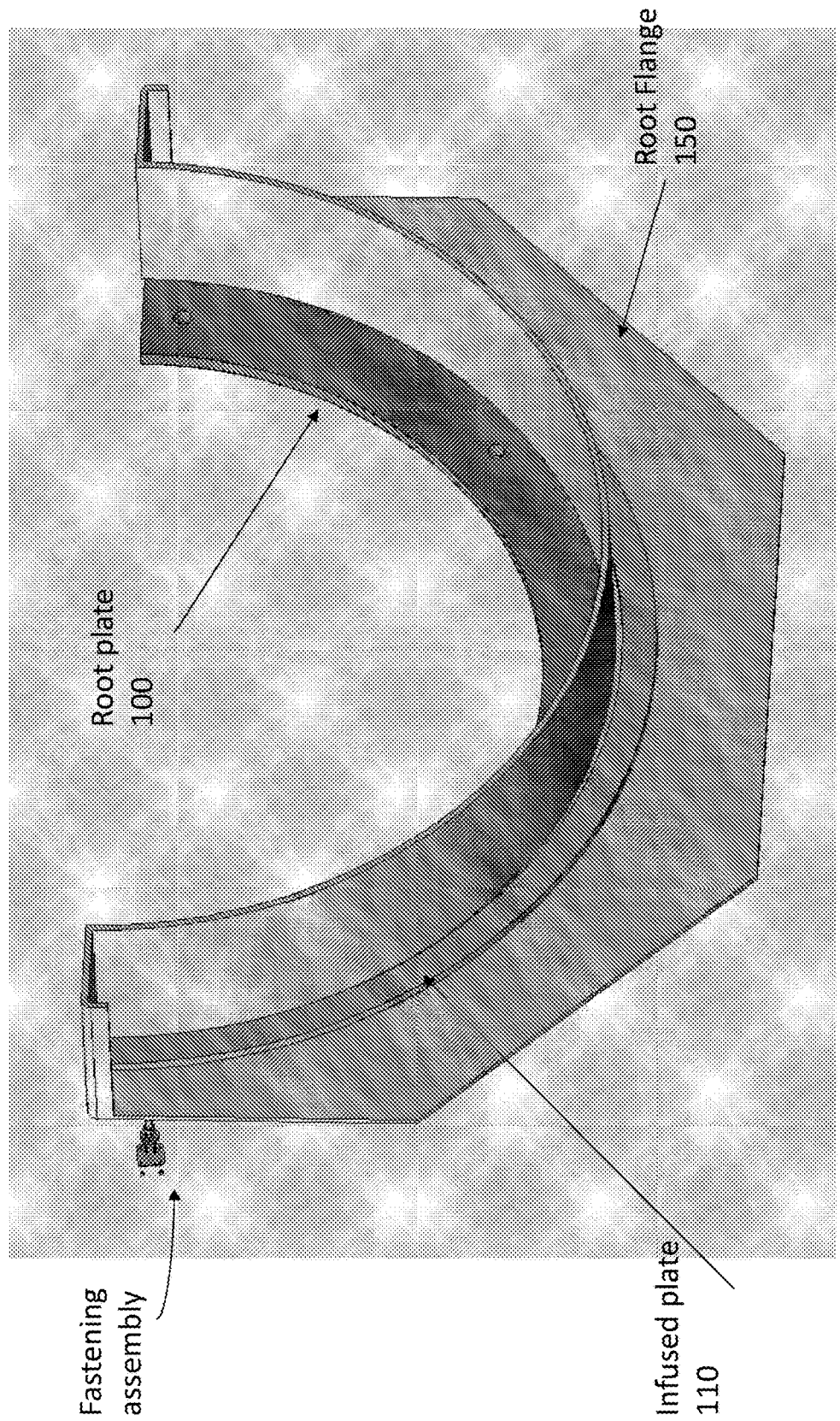
FIG. 4 is another rear perspective view of the exemplary root plate and root flange connection shown in FIG. 2.

As shown in the rear-perspective view of FIGS. 3-4, a rigid metallic (e.g. steel) plate 110 can be incorporated into the infused composite root flange 150. Thus, the two metallic plates 100, 110 are positioned on opposing sides to "sandwich" the composite root flange 150 therebetween.

Referring now to FIG. 4, the root plate assembly system is shown in rear perspective view showing infused plate 110 on the viewer-side of root flange 150. The hidden mold half (504/508) may be extending normal to plane of the arc made by infused plate 110 and attached or continuously a part of root flange 150. Although not seen in FIG. 4, infused plate 110 may include one or holes, through holes, threaded holes, or other types of apertures that match the one or patterns of apertures disposed in root plate 100. The one or more apertures of infused plate 110 may be match drilled with the apertures of root plate 100. The one or more apertures may include threads that match with the threads in the corresponding aperture of root plate 100. Any of the root plate 100, infused plate 110 and root flange 150 may be threaded to accept the same fastener in corresponding apertures. For the purpose of this disclosure, "corresponding apertures" are openings in mating parts that are axially aligned and configured to accept a fastener therethrough. FIG. 4 depicts a fastening assembly that will be discussed at greater length herein below.

Figure 5:
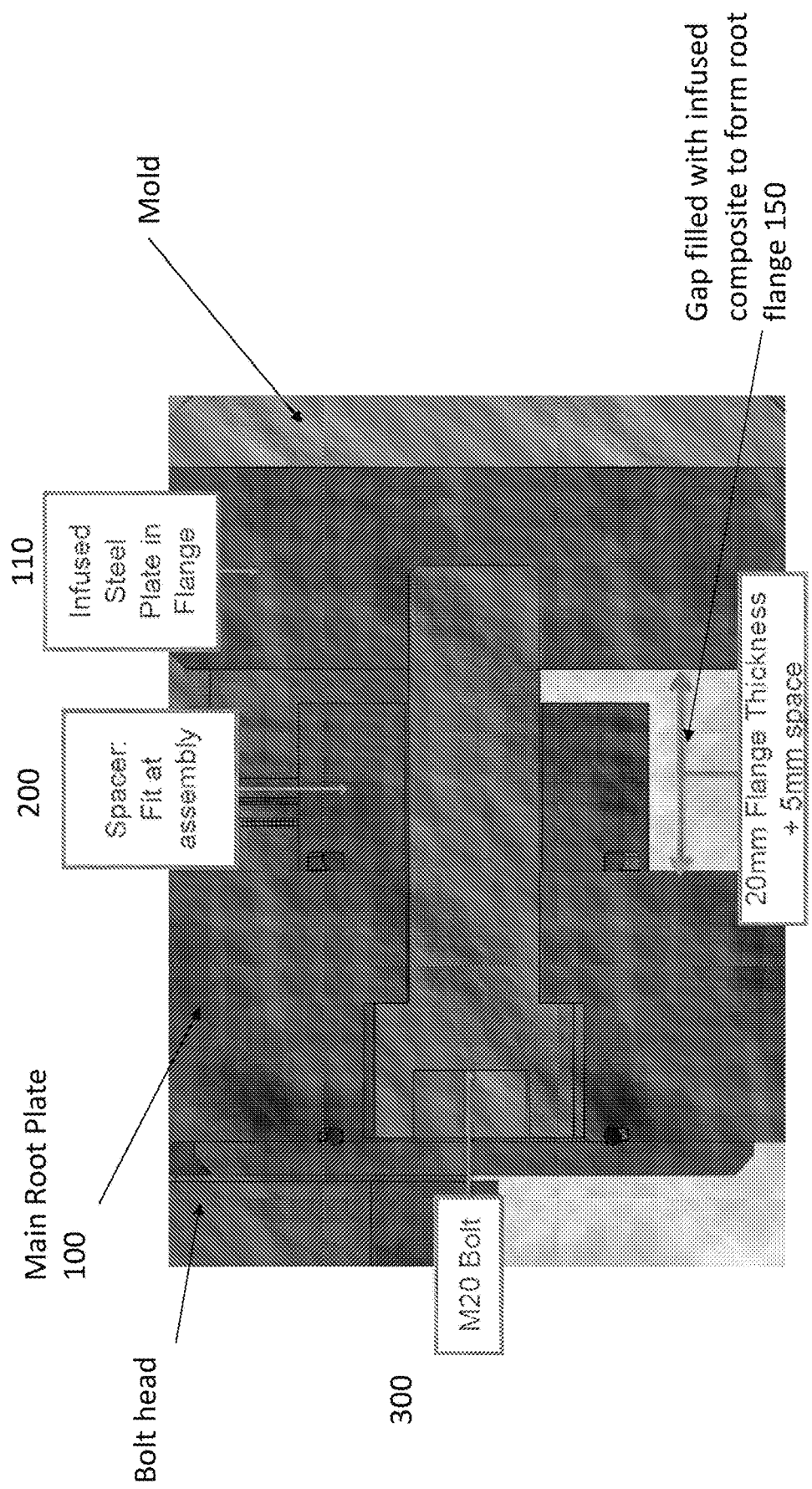
FIG. 5 is a cross-sectional view of an exemplary root plate and root flange connection, with an axially extending fastener (e.g. M20 bolt).
Figure 9:
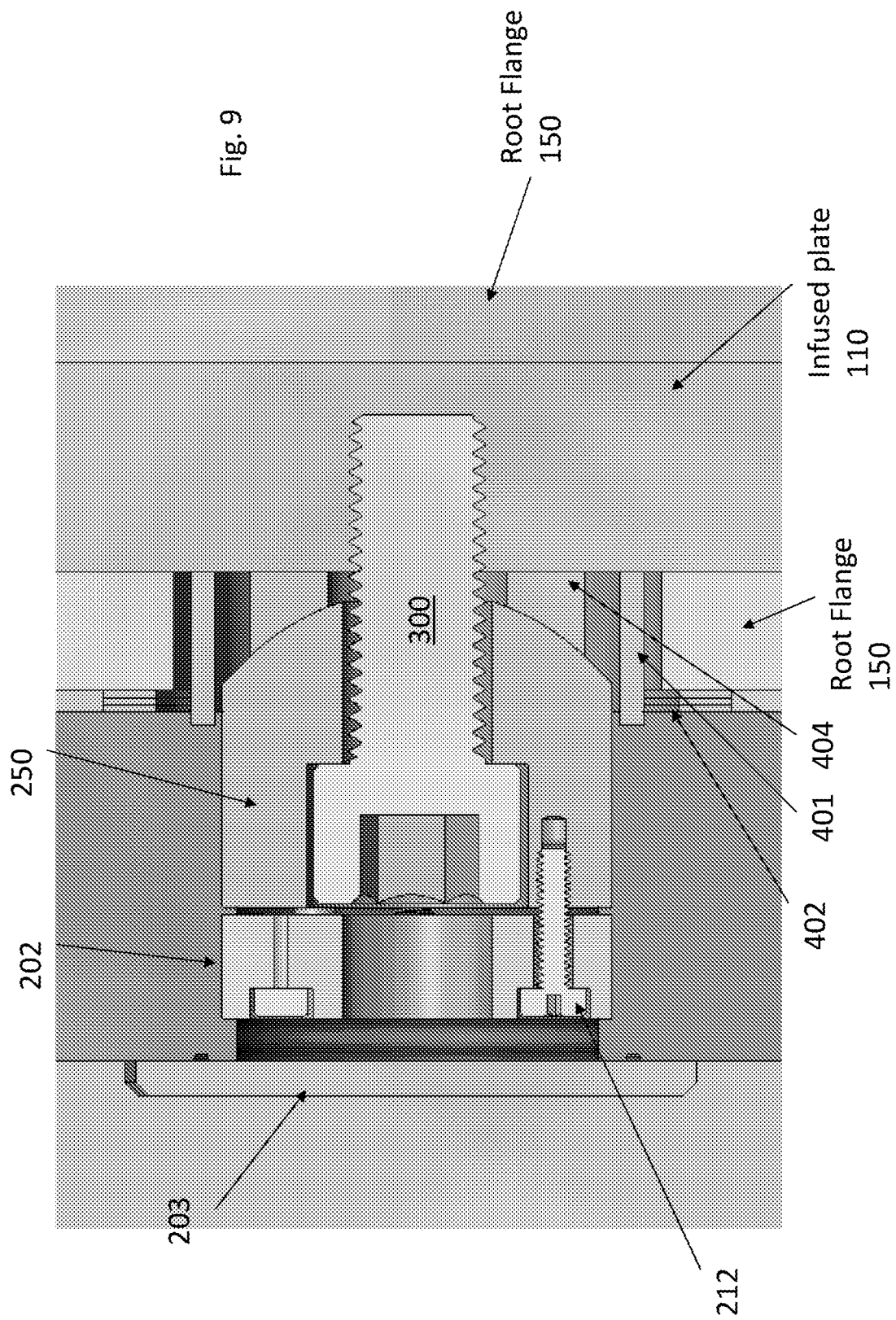
FIG. 9 is another cross-sectional view of another exemplary root plate and root flange connection, employing a spherical washer.

FIG. 5 depicts a cross-sectional view of an exemplary coupling between the root plate 100 and the composite root flange (omitted for clarity), with the front root plate 100 and rear (infused) plate 110 sandwiching the composite root flange, with all three components releasably coupled together with a fastening assembly. The fastener assembly can include a fastener 300 which extends through a spacer 200, with a distal end of the fastener 300 received within an aperture in infused plate 110 (located on the rear side of the composite flange). In the exemplary embodiment shown, the spacer 200 abuts the rear surface of root plate 100, and has a width which is less than the width of the composite flange (omitted for clarity, but occupies the gap in FIG. 5—as shown in FIG. 9). Root flange 150 is noticeably absent in FIG. 5, as it has not been infused yet. For example and without limitation, the gap between space 200, root plate 100, infused plate 110 and traversed by fastener 300 is filled with infused composite to form root flange 150. Therefore the negative space between spacer 200, root plate 100, infused plate 110 and fastener 300 assembly at least partially defines the shape and form of root flange 150. It should be noted that in this non-limiting embodiment the fastening assembly of FIG. 5 is put in place before the molding of root flange 150 and therefor rotor blade 10 is completed, or in embodiments, even started. Therefore fastening assembly may be releasably and adjustably set into root flange 150, and may therefore be adjusted after the molding of rotor blade 10, and specifically root flange 150.

Figure 6:
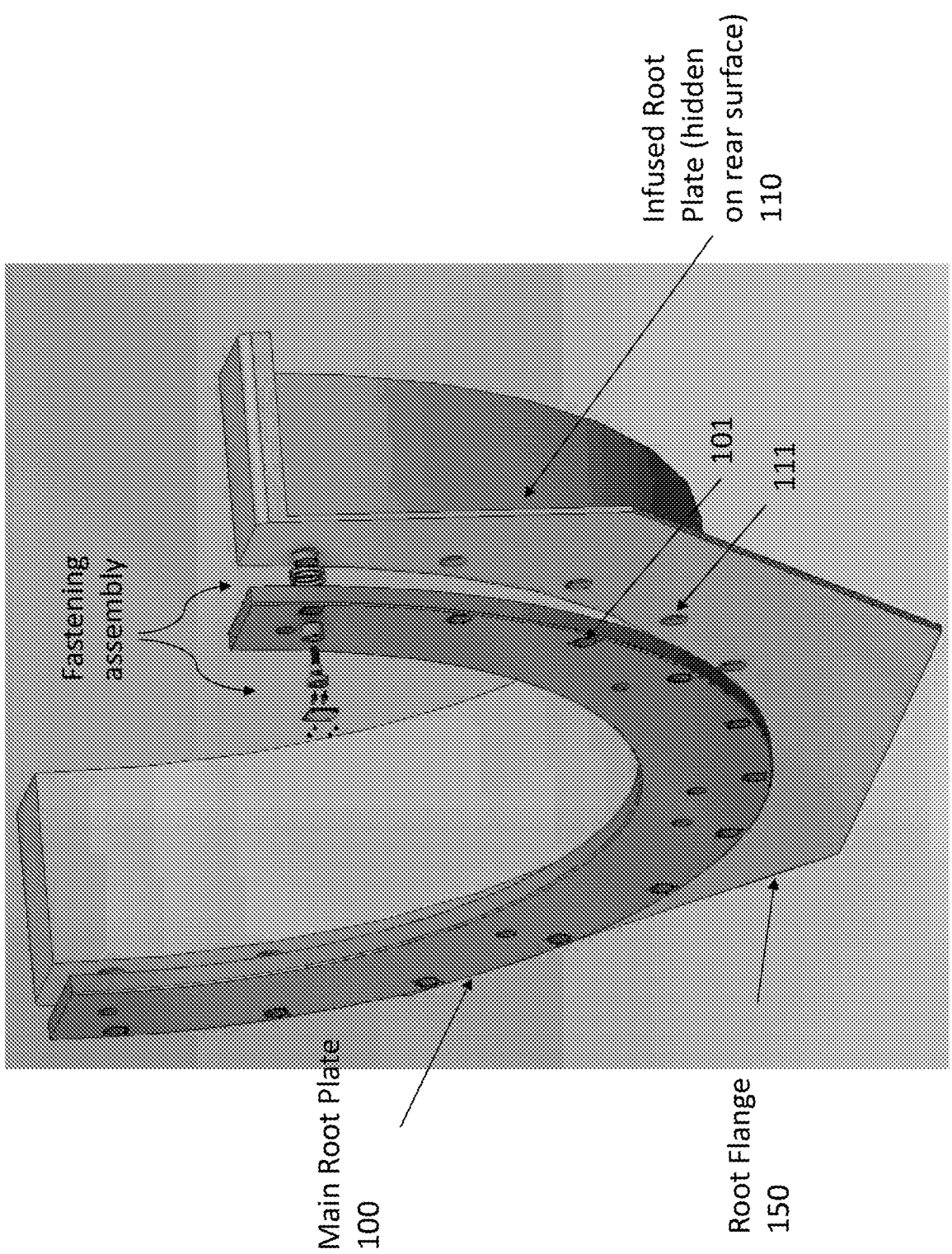
FIG. 6 is a front perspective view of an exemplary root plate and root flange connection of a wind turbine blade, showing the fastening system of the present disclosure in exploded view.
Figure 7:
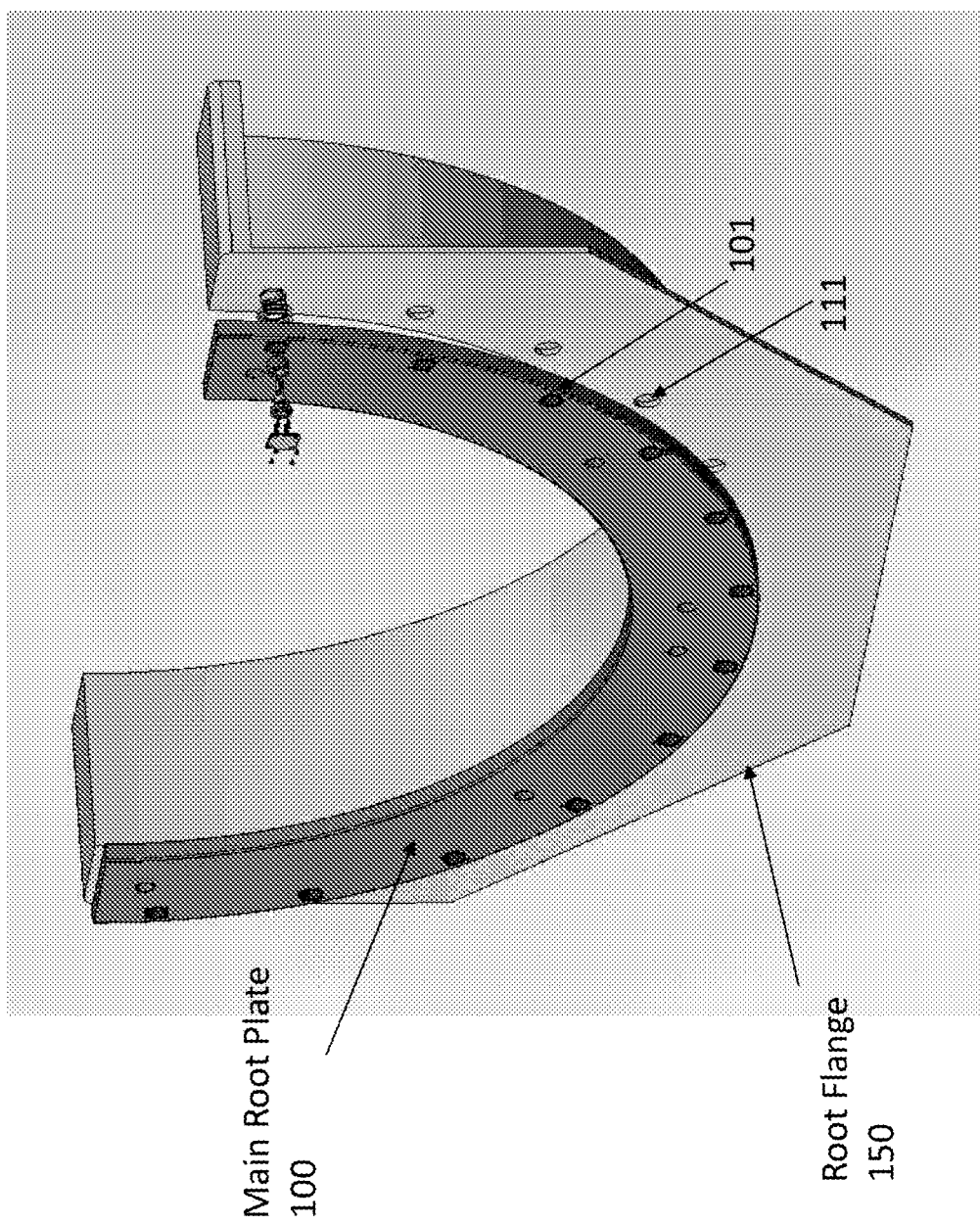
FIG. 7 is another front perspective view of an exemplary root plate and root flange connection of a wind turbine blade, showing the fastening system of the present disclosure in exploded view.

Referring now to FIGS. 6 and 7, a composite root flange 150 can be formed utilizing Vacuum Assisted Resin Transfer with infused plate 110 infused on the rear surface thereof. The root plate 100 is then positioned adjacent the front surface of root flange 150, with corresponding apertures 101, 111 provided for alignment. Corresponding apertures may be utilized only for alignment, or for alignment and securing of root plate 110 to root flange 150 and further to infused plate 110 or additionally may be used only for securing root plate 100, root flange 150 and infused plate 110.

Figure 8:
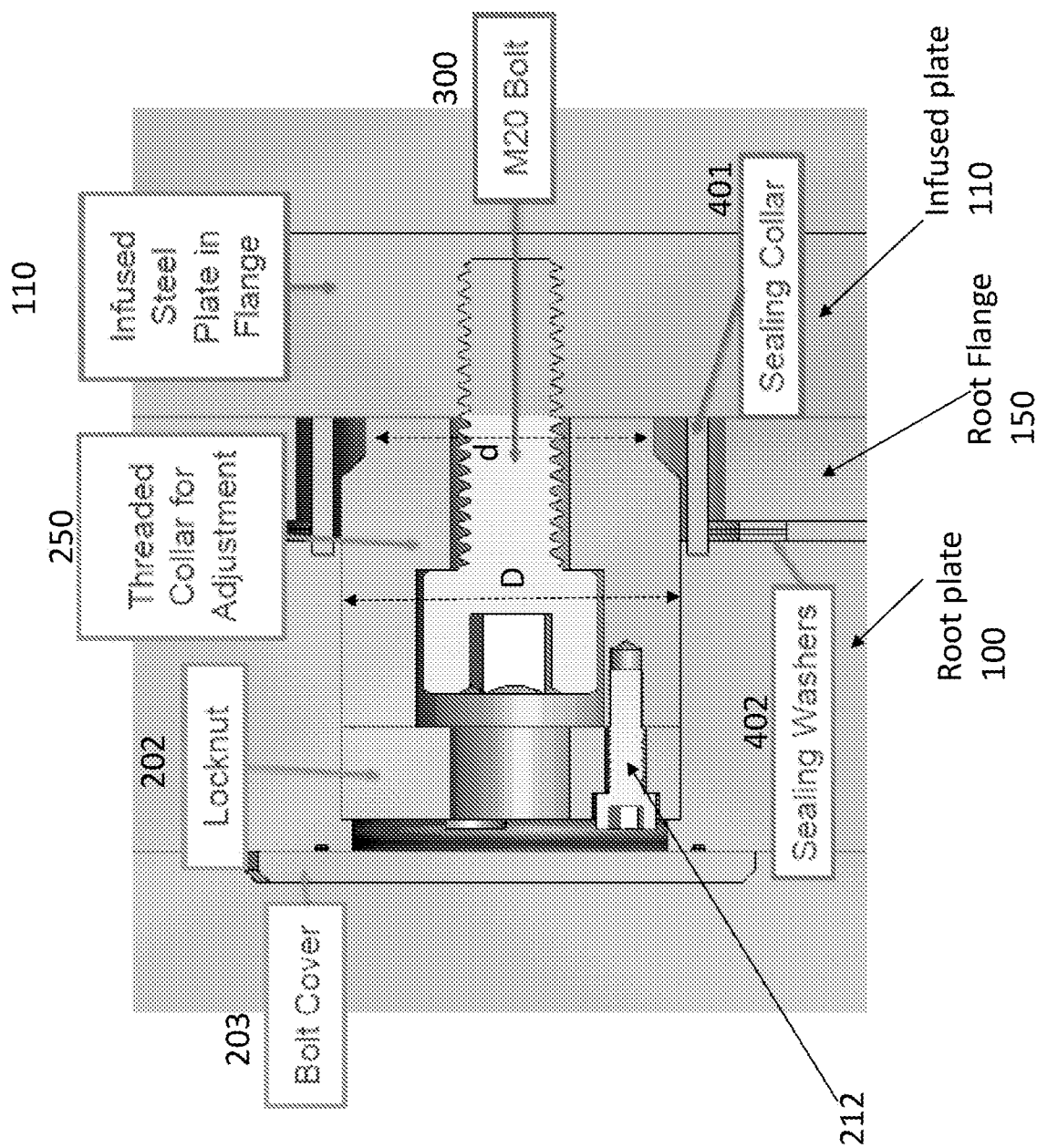
FIG. 8 is a cross-sectional view of another exemplary root plate and root flange connection, with an axially extending fastener (e.g. M20 bolt) and collar for relative axial adjustment.

Referring now to FIG. 8, a cross sectional view of an exemplary root plate 100 and root flange 150 connection, with an axially extending fastener (e.g. M20 bolt) and collar for relative axial adjustment. The connection may include root plate 100 disposed on the left hand side of the Figure. Root plate 100 includes a through hole wherein threaded collar 250 is disposed at least partially therethrough. Threaded collar 250 may include a first set of threads disposed on the outer cylindrical surface of threaded collar 250. The exterior threads of threaded collar 250 may be configured to mate with the threads of an interior cylindrical surface of aperture 101, for example and without limitation. Threaded collar 250 may be configured to be rotated along said threads and move axially within aperture 101, that is to say, by turning the threaded collar 250, the threaded collar 250 would move axially in or out of aperture 101, or any opening there disposed. Threaded collar 250 includes an interior opening including a second set of threads thereon. The second set of threads may be configured to mate and secure one or more fasteners such as fastener 300 therein. Fastener 300 may include an M20 stud bolt. Threaded collar 250 may include one or more lubricants configured to ease the turning of the threaded collar 250 within root plate 100 and/or fastener 300 within threaded collar 250. Threaded collar may be fixed to infused plate 110 according to embodiments. Threaded collar 250 may be fixed to root plate 100, according to embodiments. Threaded collar 250 may be fixed to root flange 150, according to embodiments.

With continued reference to FIG. 8, the connection assembly includes sealing collar 401 and at least one sealing washer 402. Sealing collar 401 may be configured to prevent infused composite from reaching the interior of the fastening assembly and coating the one or more threads found therein. Sealing collar 401 may be put in place prior to the infusion of composite as described above. The connection assembly includes at least one washer such as sealing washer 402. Sealing washer 402 or the plurality thereof may be configured to seal the circumference of threaded collar 250 from infused composite. That is to say that the seal may be configured for liquid-tightness at the viscosities the infused composite or resin used therein. The at least one washer such as sealing washer 402 may be configured to correspond to the type of liquid or semi-liquid materials such as resin used in the manufacture of the rotor blade 10. Connection assembly of FIG. 8 includes locknut 202 and axial lock bolts 212. Locknut 202 may include threads disposed on the outer cylindrical surface configured to mate the interior surface threads of aperture 101 or others. Locknut 202 may be configured to arrest the axial motion of threaded collar 250 and therefore fastener 300. Locknut 2020 may be included to abut the flat surface of threaded collar 250 disposed orthogonal to the axial direction of movement. Locknut may be configured to be fixed to said threaded collar 250 by one or more axial lock bolts 212. Axial lock bolts 212 may be threaded for a portion thereof of along its entire shaft length. Axial lock bolt 212 may be configured to pass through a non-threaded through hole in locknut 202 and be threaded into one or more holes in the flat surface of threaded collar 250. For example and without limitation the axial lock bolts 212 may be threaded along its entire shaft portion and be threaded through the locknut 202 and threaded collar 250. Connection assembly of FIG. 8 may include bolt cover 203 configured to close the opening wherein the fastener 300, threaded collar 250, locknut 202 and axial lock bolts 212 are disposed within. Bolt cover 203 may be one or more sheets of metal, composite, plastic or rubber configured to be coupled to root plate 100 and cover the opening left by the fastening assembly.

Referring now to FIG. 9, the connection assembly of FIG. 8 is shown in cross-sectional view. Root flange 150 can be seen in between infused plate 110 and root plate 100 (no reference character shown). Root flange 150 can be seen extending rightwards past infused plate 110 interior to infused plate 110.

Figure 10:
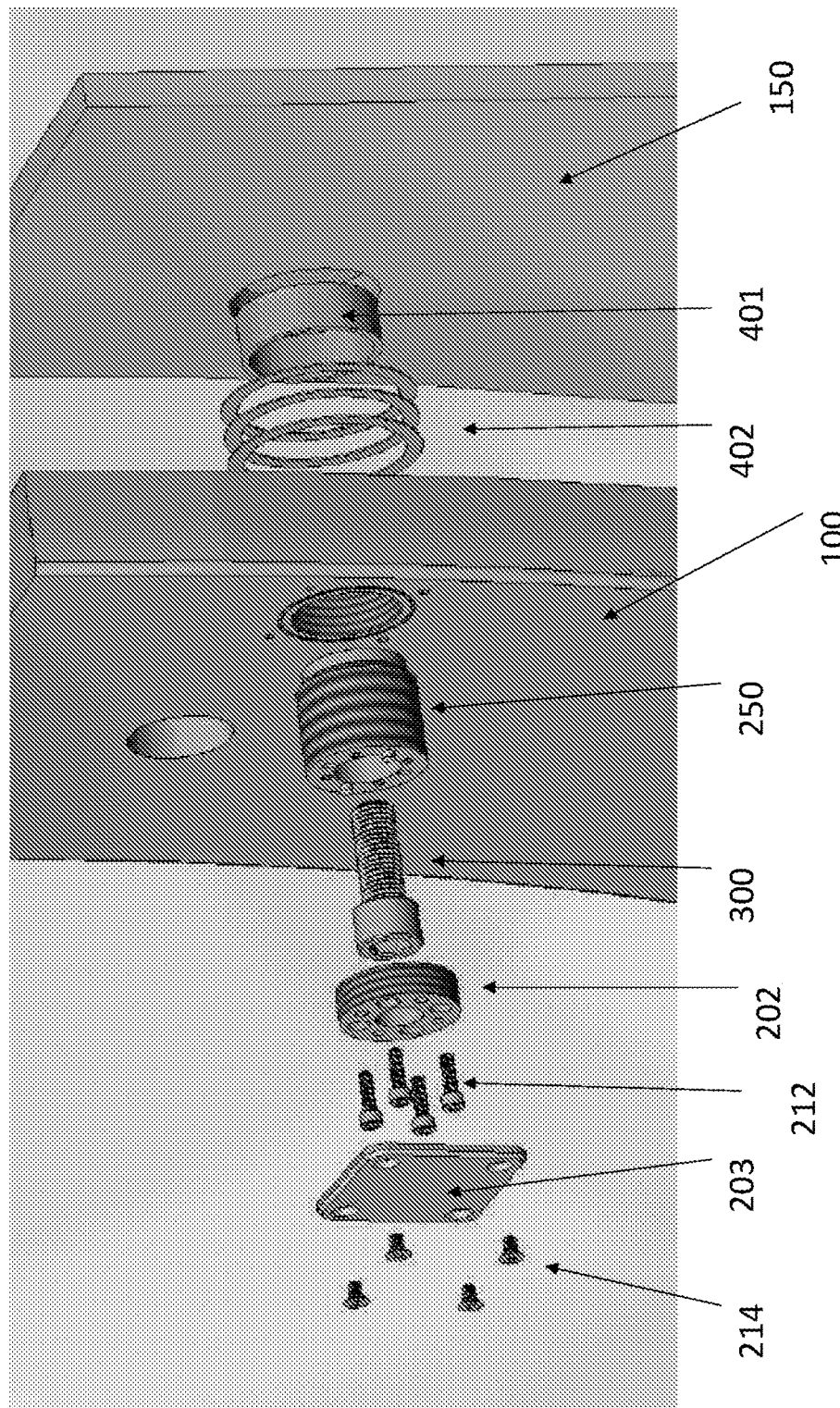
FIGS. 10-11 are front perspective detail views of the exemplary root plate and root flange connection of FIGS. 3-4 and 6-7.
Figure 11:
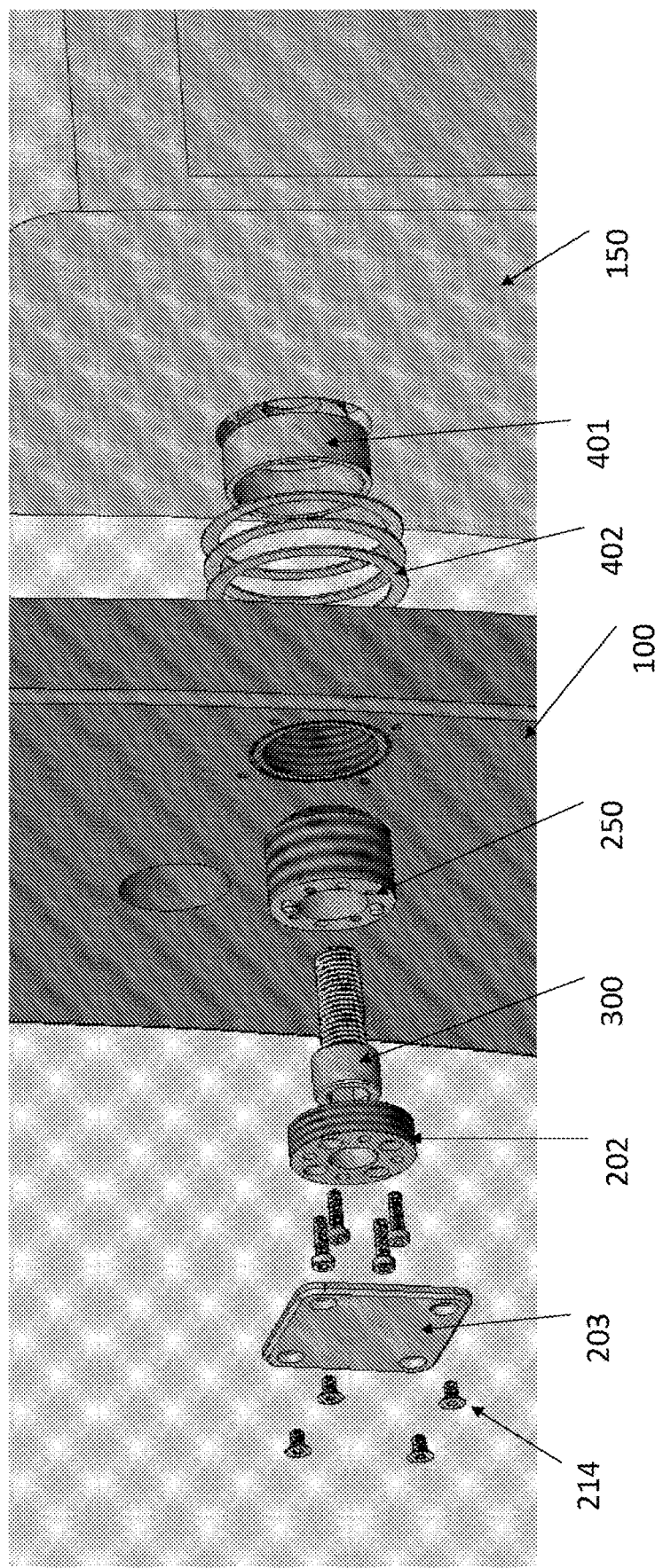

Referring now to the exploded and enlarged view of FIGS. 10-11, threaded collar 250 is provided that engages root plate 100 of the mold, extends through root flange 150, and into the rear infused plate 110, an exemplary embodiment of which is shown in cross-sectional view in FIGS. 8 and 9. Threaded collar 250 can be, fixedly (e.g. welded or glued) or releasably, bound to the infused plate 110 within the mold's flange by a socket head cap screw—the threaded collar assembly allowing for relative adjustment of the root flange and root plate (e.g. axially or spanwise displacement).

In operation, turning of threaded collar 250 generates an axial movement. For example and without limitation, clockwise turning generates axial or spanwise displacement towards the root plate 100, or from left-to-right as shown in FIGS. 8-9. This movement effectively adjusts root plate 100 with respect to root flange 150 of the wind turbine mold. Once the desired orientation (e.g. depth of insertion and axial alignment) is achieved, the adjustable threaded collar 250 is locked in position with a lock nut 202 that can be engaged through a one or plurality of axial lock bolts 212, which can then be covered by bolt cover 203 to prevent undesired loosening of bolts 212. Accordingly, the locked position of threaded collar 250, and therefore the orientation of root plate 100 remains fixed in a desired orientation within the mold, the desired orientation being without any undesired deviation or alterations. Threaded collar 250 can include an internal channel that has a first portion with a threaded internal surface to mesh with the threads of the fastener 300. A second portion of the internal channel of collar 250 can be sized to receive the head of the fastener 300 such as a counter bore or countersink. Also, threaded collar 250 is sized with a first diameter "D" (e.g. which receives the head portion of the fasteners 300) and a smaller diameter "d" (e.g. which receives the threaded portion of the fasteners 300).

A sealing collar 401 is provided which circumscribes the fastener 300 and threaded collar 250, with the sealing collar 401 extending laterally outward from the exterior surface of the root flange 150. The sealing collar 401 extends a distance outward beyond the location of the sealing washers 402, and terminates at a location that coincides with the top of the threaded portion of the fastener 300 (e.g. the location where the head portion of the fastener 300 is located). In some embodiments, the sealing collar 401 can deform to create a seal with the inner diameter of the apertures within the root flange 150. For example, the sealing collar 401 form radially expanding bellows as the axial/spanwise portion is compressed.

In some embodiments a spherical washer 404 can be incorporated into the assembly, as shown in the cross-sectional view of FIG. 9. The spherical washer 404 can be positioned (axially) between the threaded collar 250 and the root flange 150. Spherical washers, also known as Self-Aligning Washers or Equalizing Washers, may be configured for fastening applications on an uneven surface. The washer set consists of a "top" half that is convex and a "bottom" half that is concave. The top washer has a slightly narrower inner diameter than the bottom washer while both have the same radius. This enables a bolt or screw to pass through both washers and "self align" allowing for a flat damping washer surface. The spherical washer sets are designed for a 3-4 degree angle of correction. Also, the spherical washer 404 can be sized with an outer diameter less than the outer diameter of the threaded collar 250 (as well as less than the inner diameter of the sealing collar 401 and sealing washers 402). Sealing and/or cushioning washers create an airtight/watertight/liquid tight seal between fasteners and surfaces. Also k n as rubber washers or sealing washers, they prevent leakage around plumbing fixtures, brake systems, hydraulic applications, resin molds, or the like. The distal end of the threaded collar can include a conical (and optionally un-threaded) portion that projects into the aperture of the spherical washer 404, as shown in FIG. 9. The outer diameter of the threaded collar 230 can likewise be sized so as to be concentrically received by the sealing collar 401 and sealing washers 402.

FIG. 10 shows an exploded view of the various components shown in FIG. 8. The root flange 150 includes an aperture that receives sealing collar 401 therein. A plurality (e.g. three) sealing washers 402 are positioned in adjacent to and in contact with the root flange 150, and sized with a diameter greater than the aperture containing the sealing collar 401 therein. This prevents the sealing washers 402 from being positioned within the aperture, and occluding or interfering with the insertion of the sealing collar 401. The washers 402 are similarly positioned adjacent to and in contact with the root plate 100 on the opposing side.

The (externally) threaded collar 250 is inserted within a complimentarily threaded aperture in the root plate 100, with a distal/bottom end of the collar 250 passing through the washers 402 and into the sealing collar 401 within the aperture of the composite flange 150. The presence of the sealing washers 402 and sealing collar 401 prohibit resin from reaching the adjustment mechanism of the collar 250 and fastener 300 interaction. Also, the present disclosure allows for all axial adjustments to be performed form outside of the mold through the removal of sealed access covers, and without removal of the complete root plate assembly.

The fastener 300 has external threads that, when inserted through and beyond the bore/channel of the collar 250, engage the complimentary threads on the interior surface of the infused root plate 110. As the fastener 300 is turned the threaded engagement with the infused plate 110 draws the fastener further into the infused plate 110, with the portion of the fastener 300 disposed within the threaded collar 250 having an interference, or friction fit, engagement; thus here the threads of fastener 300 only establish a threaded coupling with the complimentary threads of the infused root plate 110. A locking nut 202 is then applied on top of the fastener to inhibit or prohibit relative movement (e.g. loosening/retraction) between the threaded collar 250 and the root plate 100. Furthermore, the locking nut 202 is itself retained in a locked position with a plurality (e.g. four equidistantly spaced) screws 212 which extend from the top of the locknut 202, beyond the head of the fastener 300, and are received within apertures formed in the sidewall of the collar 250, as shown in FIG. 6. Next, a bolt covering plate 203 is attached to the upper/outer surface of the root plate 100, with the bold covering plate spaced from the outer/upper surface of the locknut 202 and screws 212. Thus, the covering plate 203 encloses threaded collar 250, and is retained in locked position via screws 214.

For purpose of illustration and not limitation, the fastener 300 can be formed as a bolt having threads configured to mesh with threads formed on the interior surface of the infused root plate 110. As described above, the fastener 300 is sized with an outer diameter proximate the head, that is sufficient to establish an interference fit within the threaded collar 250. In some embodiments, the fastener may be configured as a M20-M50 threaded stud bolt. Other lengths may also be possible and the invention is not limited to the range above. The exemplary views presented herein focus on a single fastening assembly for clarity, but a plurality of fastening assemblies can be incorporated and distributed about the circumference of the root plate/flange. For example, the fastening assemblies can be equidistantly spaced from each other.

Figure 12A:
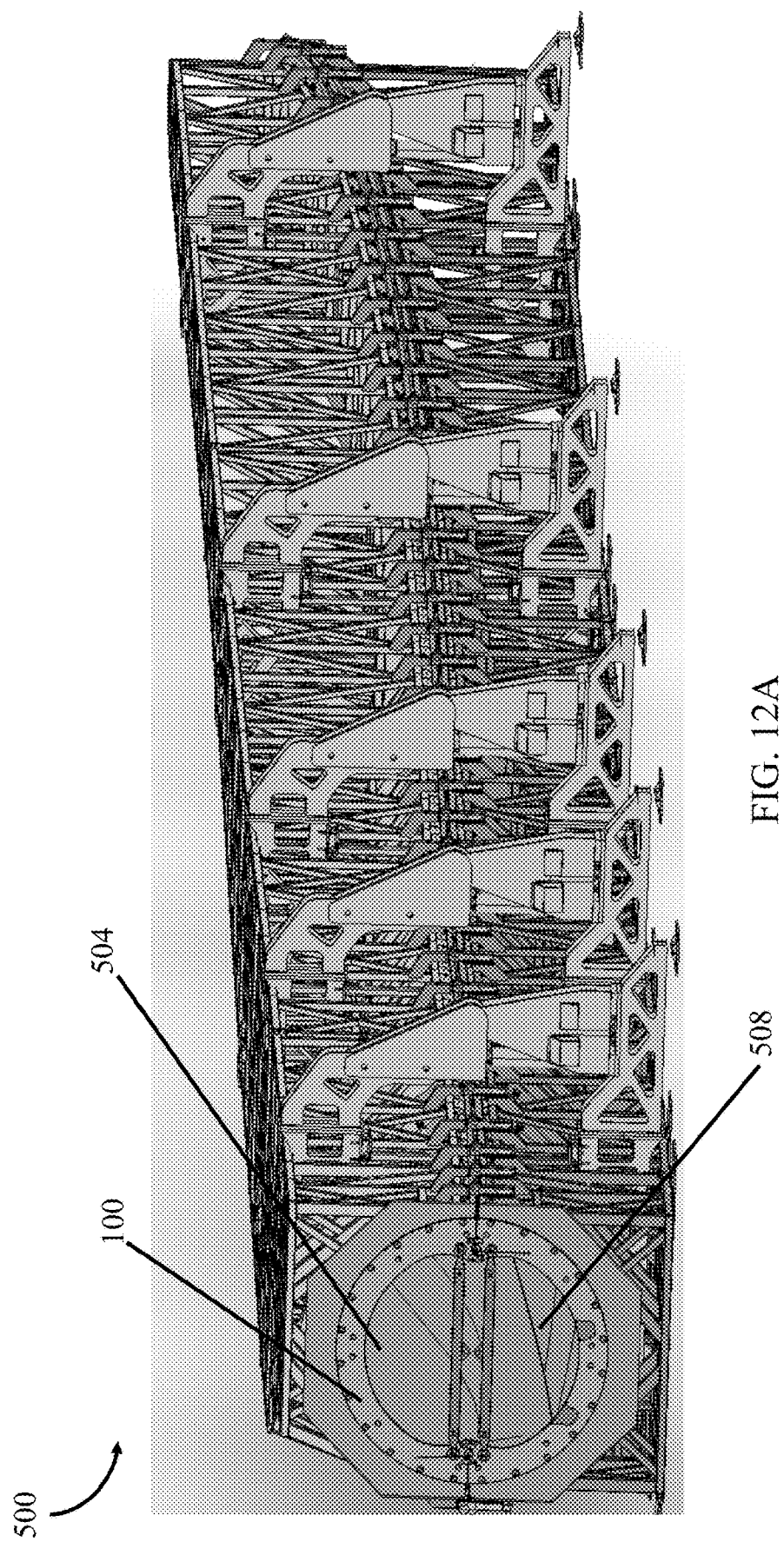
FIG. 12A-C are perspective views of a mold configured to manufacture a wind turbine blade, in clamshell form and the two half molds.

Referring now to FIG. 12A, a mold 500 is shown in perspective view. It can be seen from FIG. 12A that mold 500 includes a first mold half 504 and a second mold half 508 configured to be clamped together creating a void between the two halves, the void defining the outer mold line of rotor blade 10. Root plate 100 can be seen as two halves joined to create a circular root plate, each half of root plate 100 associated with mold half 504 and mold half 508. Mold 500 may include one or more clamps that can be seen where the two mold halves meet and create a seal between the two halves. The clamps may be regularly spaced or spaced at strategic points where more or less pressure is required to seal the mold halves 504, 508. One mold half may be designed to be a pressure side of a vacuum assisted resin transfer process mold and one mold half may be designed to be the vacuum side of a VART process. Mold 500 may include one or more hinges and/or linkages configured to maneuver and support mold 500 during the opening and closing process. The mold 500 may be opened and/or closed automatedly by one or more actuators or by hand. The hinges and/or linkages may be additionally capable of assisting in the clamping of mold 500. High-rate production tools, such as mold 500, for example, may be made of robust metals that can stand up to repeated cycles and maintain good surface finish and dimensional accuracy. Mold 500 may be configured to produce rotor blade 10, which are high-performance composite parts that can be formed can be made from carbon fiber/epoxy, monolithic graphite, castable graphite, ceramics or metals (typically aluminum, steel and alloys of the same). According to embodiments, each material offers unique capabilities and drawbacks.

Figure 12B:
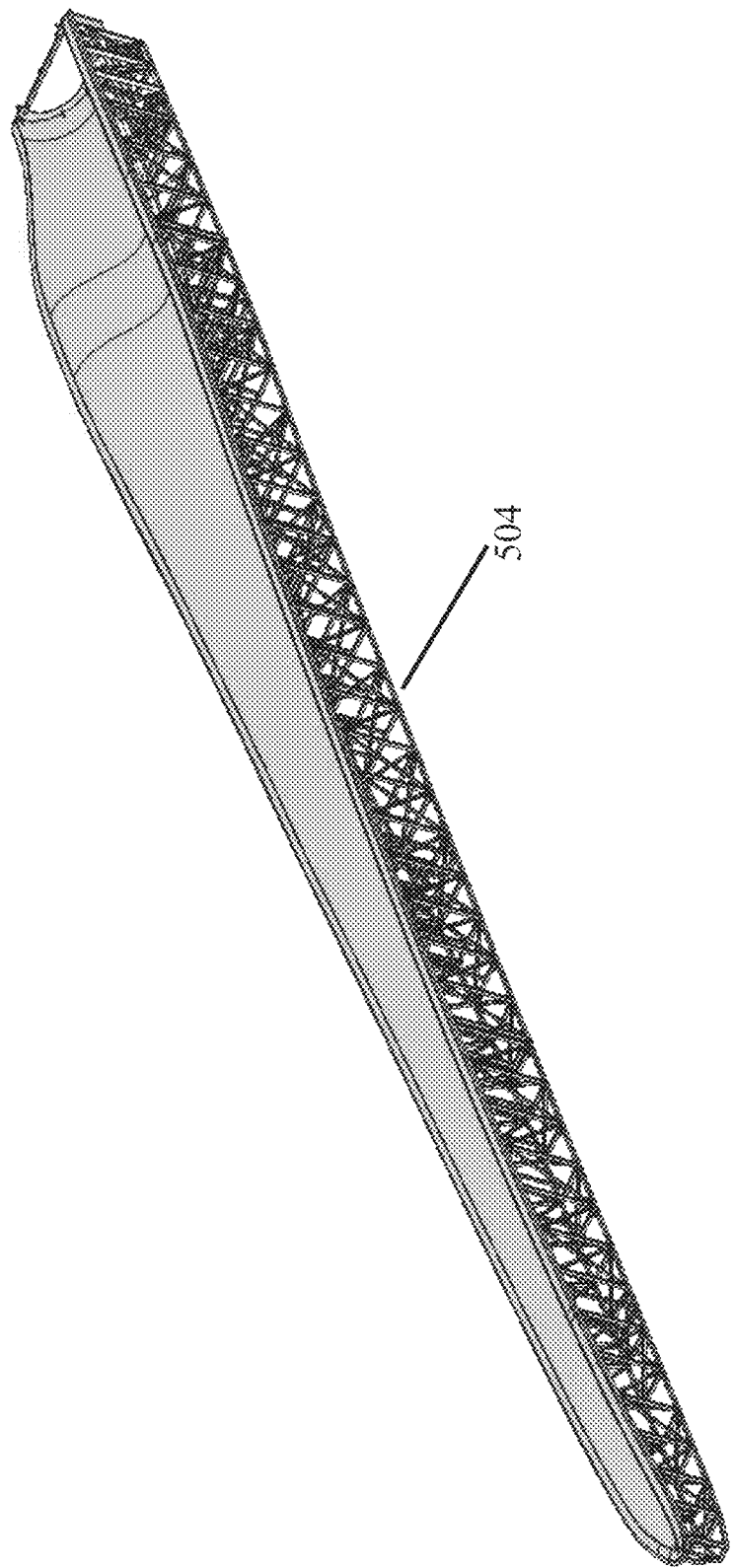
Figure 12C:
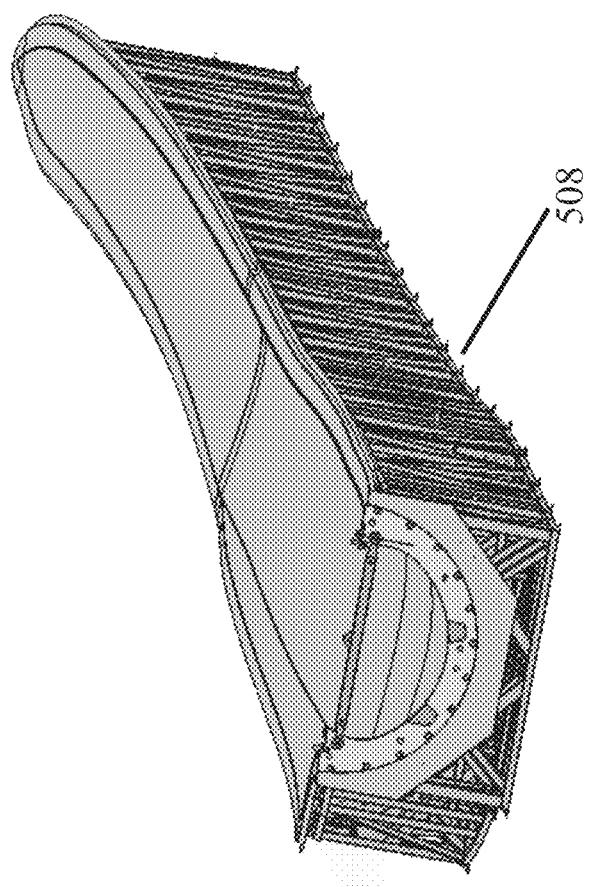

Referring now to FIGS. 12B and 12C, mold haves 504, 508 are shown in perspective views. The mold half 504 may be configured to define one half of a rotor blade 10. The mold half 504 may be the top or bottom half of one or more airfoils along the length of rotor blade 10 relative to the chord of the airfoil. Mold halves 504, 508 may be configured to be supported by one or more struts, support members or super structure to support the shape of mold 500 before and during the subjection of the interior of the mold to a vacuum.

Referring now to FIG. 13, a method for adjustable coupling of a root plate assembly is presented in flow diagram form. Method 1300 includes, at step 1305, providing a root plate such as root plate 100. Root plate 100 may be any root plate as described herein. Root plate 100 may be configured to support and attach to the root portion of a mold such as mold 500, specifically mold half 504 and/or 508. Root plate 100 may be include one or more apertures such as aperture 101/111 as described herein comprising one or more patterns.

Still referring to FIG. 13, method 1300 includes, at step 1310, providing a threaded collar such as threaded collar 250. Threaded collar 250 including a longitudinally extending channel therethrough, the channel axially and concentrically aligned with at least one aperture. Threaded collar 250 includes threads disposed on the external cylindrical surface configured to mesh with threads disposed on the interior cylindrical surface of the aperture in which threaded collar 250 is disposed. Threaded collar 250 may be configured to rotate through the threads thereby axially adjusting the position of threaded collar 250 in the aperture. Threaded collar 250 includes threads disposed on the internal cylindrical surface of threaded collar 250 configured to mesh with a fastener such as fastener 300.

Still referring to FIG. 13, method 1300 includes, at step 1315, providing an infused plate such as infused plate 110. Infused plate 110 may be any infused plate as described herein. Infused plate 110 may be machined into a root flange 150, root flange 150 may be any root flange as described herein. Infused plate 110 may include openings, holes apertures corresponding to the apertures disposed in root plate 100. Infused plate 110 may be partially or fully infused into root flange 150 by adhesives, fasteners, or a combination thereof.

Still referring to FIG. 13, method 1300 includes, at step 1320, providing a fastener disposed through the threaded collar's longitudinally extending channel. The fastener may be fastener 300 or any suitable fastener. Fastener 300 includes threads disposed on at least a portion of the fastener configured to mesh with the internal threads of threaded collar 250. Fastener 300 may be partially seated with threaded collar 250, at least partially seated within root plate 100, and at least partially through infused plate 110.

Still referring to FIG. 13, method 1300 includes, at step 1325, providing infused composite to form the root flange such as root flange 150. Infused composite may, in embodiments be present before the fastening of the assembly as described hereinabove. Infused composite may be applied after the fastening of the aforementioned components. Root flange 150 may be a continuous component with the each of the mold halves 504/508. Root flange 150 may be coupled to another or a plurality of components of one or more mold halves 504/508. Although not shown in FIG. 13, the components may be sealed from the infused composite and/or the resin from the molding process by one or more sealing components such as sealing collar and at least one washer such as sealing washer as described herein. Fastener 300 may be partially threaded through root plate 100, root flange 150 and infused plate 110, or a portion thereof. The fastener 300 is partially disposed through threaded collar 250 disposed in root plate 100.

Still referring to FIG. 13, method 1300 includes, at step 1330, adjusting the threaded collar 250. Threaded collar 250 is adjusted by turning the threaded collar 250 along the threads of root plate 100, thereby axially moving threaded collar 250 up or down in the aperture it's disposed in. Threaded collar 250 is adjusted and thereby adjusts the threaded portion of the fastener in the above mentioned components.

Still referring to FIG. 13, method 1300 includes, at step 1335, adjustably coupling the root plate to the infused plate. The root plate may be root plate 100 and the infused plate may be infused plate 110. The distance between root plate 100 and infused plate 110 and therefore the distance between root flange 150 and root plate 100 is variable according to the position of threaded collar 250 and fastener 300.

Thus, the present disclosure provides a structural configuration, and method, for adjustment of the root plate relative to the root flange of the blade mold that is facilitated by threaded components, and avoids the need for complex custom-fit washers, etc., that must be sized at the assembly stage. While the present disclosure primarily provides for axial adjustment of the root plate and root flange, some lateral/vertical adjustment can also be performed by operation of the fastening system (e.g. inserting/withdrawing the bolt 300 within the collar 250). The techniques disclosed herein can be used on all root plates affixed to composite molds with semi-permanent intent. Modifications can be performed in the case of a frequently removed root plate (as driven by process needs) whereas adjustment components can move to the interfacing mold frame, as opposed to inside of the plate, in some embodiments.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A root plate assembly system for a wind turbine blade comprising:
   a root plate, the root plate comprising a flange portion with at least one aperture disposed therein;
   a sealing collar, the sealing collar disposed within the aperture in the root plate;
   at least one washer, the washer comprising a larger diameter than the aperture in the root plate;
   a threaded collar, the threaded collar comprising a longitudinally extending channel and threads on an outer surface thereof;
   a fastener disposed at least partially within the longitudinally extending channel of the threaded collar;
   a locknut disposed above the fastener, the locknut abutting the fastener; and
   a bolt cover disposed over the locknut to enclose the threaded collar.

2. The root plate assembly system of claim 1, wherein the threaded collar comprises a first portion comprising a first diameter and a second portion comprising a second diameter, defining an interior shelf therebetween.

3. The root plate assembly system of claim 2, wherein the fastener comprises a head portion and a stem portion, the head portion abutting a shelf of the threaded collar.

4. The root plate assembly system of claim 1, further comprising a root flange, the root flange disposed adjacent the root plate.

5. The root plate assembly system of claim 4, further comprising an infused root plate, the infused root plate disposed adjacent the root flange.

6. The root plate assembly system of claim 5, wherein the distal end of the fastener comprises threads, the fastener threads configured to engage interior threads of the infused root plate.

7. The root plate assembly system of claim 1, wherein the locknut inhibits relative movement between the threaded collar and the root plate.

8. The root plate assembly system of claim 1, wherein the locknut comprises a diameter larger than the head of the fastener.

9. The root plate assembly system of claim 1, wherein the locknut comprises a diameter equivalent to a diameter of the threaded collar.

10. The root plate assembly system of claim 1, wherein the sealing collar comprises an internal diameter larger than the outer diameter of the threaded collar.

11. The root plate assembly system of claim 1, wherein each of the fastener, the threaded collar, the sealing collar and the at least one washer are axially aligned in a concentric configuration.

12. The root plate assembly system of claim 1, wherein a distal end of the threaded collar comprises a non-threaded skirt portion.

13. The root plate assembly system of claim 1, wherein a distal end of the threaded collar comprises a non-threaded conical portion.

14. The root plate assembly system of claim 1, further including a spherical washer disposed between the threaded collar and the root flange.

15. The root plate assembly system of claim 14, wherein the spherical washer comprises an outer diameter less than the outer diameter of the threaded collar.

16. The root plate assembly system of claim 1, the threaded collar is fixed to the infused root plate.

\* \* \* \* \*